(12) United States Patent
Okamoto

(10) Patent No.: US 8,953,492 B2
(45) Date of Patent: Feb. 10, 2015

(54) ROUTE DETERMINATION DEVICE, NODE DEVICE, AND ROUTE DETERMINATION METHOD

(75) Inventor: Takuya Okamoto, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 95 days.

(21) Appl. No.: 13/610,087

(22) Filed: Sep. 11, 2012

(65) Prior Publication Data

US 2013/0121208 A1 May 16, 2013

(30) Foreign Application Priority Data

Nov. 10, 2011 (JP) .................................. 2011-246584

(51) Int. Cl.
*H04L 12/28* (2006.01)
*H04L 12/26* (2006.01)
*H04L 12/717* (2013.01)

(52) U.S. Cl.
CPC ...................................... *H04L 45/42* (2013.01)
USPC ........... 370/254; 370/216; 370/217; 370/218; 370/220; 370/221; 370/225

(58) Field of Classification Search
CPC ......... H04L 45/50; H04L 45/02; H04L 45/00; H04L 12/24; H04L 41/00; H04Q 3/66; H04Q 2213/13141; H04Q 2213/13164; H04Q 2213/13332
USPC .................................................. 370/216–228
See application file for complete search history.

(56) References Cited

U.S. PATENT DOCUMENTS

| | | | |
|---|---|---|---|
| 5,321,815 A | 6/1994 | Bartolanzo, Jr. et al. | |
| 6,891,943 B1 * | 5/2005 | Liebl | 379/219 |
| 7,349,350 B2 * | 3/2008 | Liu | 370/255 |
| 7,593,321 B2 * | 9/2009 | Galand et al. | 370/218 |
| 2004/0100904 A1 * | 5/2004 | Chander et al. | 370/235 |
| 2006/0253606 A1 | 11/2006 | Okuno | |
| 2010/0074101 A1 * | 3/2010 | Skalecki et al. | 370/221 |

FOREIGN PATENT DOCUMENTS

| | | |
|---|---|---|
| JP | 3-139936 | 6/1991 |
| JP | 2006-313949 | 11/2006 |
| JP | 2009-188573 | 8/2009 |

* cited by examiner

*Primary Examiner* — Edan Orgad
*Assistant Examiner* — Rebecca Song
(74) *Attorney, Agent, or Firm* — Staas & Halsey LLP

(57) ABSTRACT

A route determination device includes a memory to store a piece of route information of the route which is already calculated; and a processor to execute a process including: receiving a calculation request which requests route calculation; determining the route which conforms to the calculation request by performing the route calculation when the route information stored in the memory does not include the route which conforms to the calculation request; obtaining the route which conforms to the calculation request from the route information when the route information stored in the memory includes the route which conforms to the calculation request; storing the route information of the route determined by route determining processing in the memory; and sharing, with another route determination device which determines the route going through another node device among the plurality of node devices, the route information of the route determined by the route determining processing.

7 Claims, 14 Drawing Sheets

FIG. 4

| NO | START POINT NODE DEVICE | END POINT NODE DEVICE | ROUTE | RESTRICTION CONDITION | EMPTY BANDWIDTH | VALID FLAG | GENERATION DATE |
|---|---|---|---|---|---|---|---|
| 1 | NODE 2a | NODE 2e | 2a,2c,2e | RELIABILITY PRIORITY | 100Mbps | VALID | JULY 1, 2011 12:30:00 |
| 2 | NODE 2a | NODE 2c | 2a,2c | LOW DELAY PRIORITY | 50Mbps | INVALID | JULY 1, 2011 12:40:30 |
| 3 | NODE 2b | NODE 2d | 2b,2a,2d | SHORTEST HOP NUMBER | 1000Mbps | VALID | JULY 2, 2011 20:45:00 |

ROUTE DETERMINATION DEVICE, NODE DEVICE, AND ROUTE DETERMINATION METHOD

CROSS-REFERENCE TO RELATED APPLICATIONS

This application is based upon and claims the benefit of priority from the prior Japanese Patent Application No. 2011-246584 filed on Nov. 10, 2011, the entire contents of which are incorporated herein by reference.

FIELD

The embodiments discussed herein are related to a route determination device, a node device, and a route determination method.

BACKGROUND

To select a route in a network, there has been a method, performed by one node in the network, for calculating a preferable route among nodes, storing results from the route calculation in a tree-shaped form, and supporting the calculation of the preferable route. According to the above-described method, the number of calculation desired for formation of a tree coupling arbitrary two nodes may be reduced.

There is a packet transfer device that includes a routing table with two different functions in line cards of the packet transfer device. A first routing table is a local routing table that records transfer information that is frequently used as a sequential group. A second routing table is a distribution shared routing table that records the transfer information in such a way that the transfer information is distributed and does not match the other line card in the packet transfer device and that all the distributed information matches all the transfer information held in the packet transfer device.

There is a route information management device that includes a database, in which an Internet protocol (IP) address of a communication device and communication data to be transmitted to the communication device are stored in association with each other, and a calculating unit, which obtains the route information transmitted from another decide and calculates a route chart based on the route information, and a database updating unit, which reflects the route chart calculated by the calculating unit on the database. For example, Japanese Laid-open Patent Publication No. 3-139936, Japanese Laid-open Patent Publication No. 2006-313949, and Japanese Laid-open Patent Publication No. 2009-188573 are disclosed as the related art.

SUMMARY

According to an aspect of the invention, a route determination device includes a memory to store a piece of route information of the route which is already calculated; and a processor to execute a process including: receiving a calculation request which requests route calculation; determining the route which conforms to the calculation request by performing the route calculation when the route information stored in the memory does not include the route which conforms to the calculation request; obtaining the route which conforms to the calculation request from the route information when the route information stored in the memory includes the route which conforms to the calculation request; storing the route information of the route determined by route determining processing in the memory; and sharing, with another route determination device which determines the route going through another node device among the plurality of node devices, the route information of the route determined by the route determining processing.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 4 is a diagram illustrating an example of route calculation information;

DESCRIPTION OF EMBODIMENTS

Figure 1:
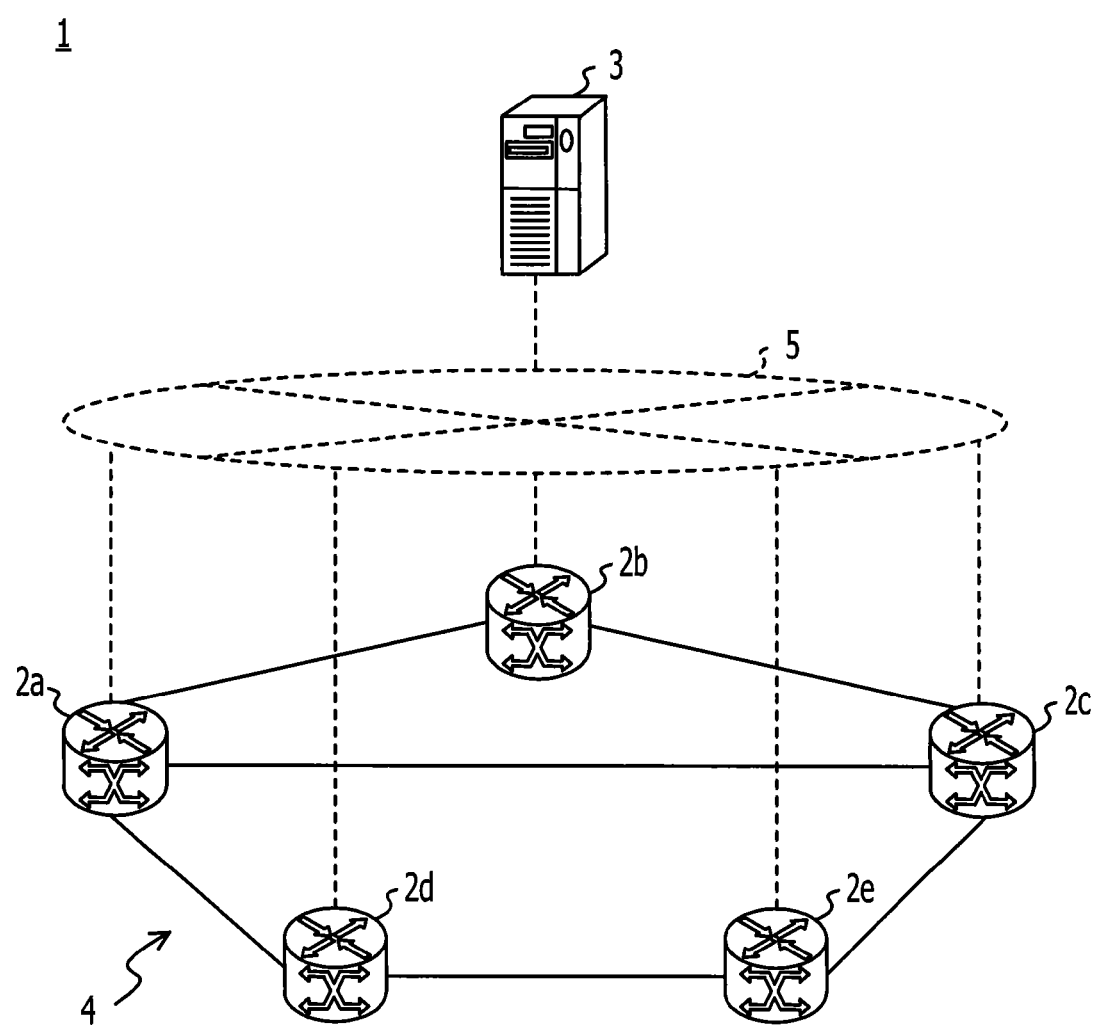
FIG. 1 is a diagram illustrating an example of a whole configuration of a communication system.

With reference to the attached diagrams, embodiments of the present invention will be described below. FIG. 1 is a diagram illustrating an example of a whole configuration of a communication system. A communication system 1 includes node devices 2a to 2e and a network control device 3. A transfer network 4 that transfers traffic, that is, user data is formed by coupling the node devices 2a to 2e with each other by a link The network control device 3 is coupled to the node devices 2a to 2e through a control network 5 that is provided to monitor and control the transfer network 4. By using the network control device 3, a maintainer performs operation control and state monitoring of the node devices 2a to 2e forming the transfer network 4. Hereinafter, the node devices 2a to 2e may be collectively indicated as "node device 2."

The configuration of the node device 2a according to a first embodiment will be described below. The node devices 2b to 2e have the configuration equivalent to the node device 2a described below. The node device 2a includes a control circuit 10, line interface circuits 11a and 11b, and a switch circuit 12.

A control circuit 10 controls operation of the node device 2a. The control circuit 10 includes a processor 13, a memory 14, a network interface circuit 15, and an interface circuit 16. In the attached diagrams, the network interface and the interface may be indicated as "NIF" and "I/F," respectively. By executing a control program stored in the memory 14, the processor 13 performs processing for controlling the operation of the node device 2a and route determination processing described below.

The memory 14 may include a non-volatile memory that stores data used for the control program and the execution of the control program, a Read Only Memory (ROM), or the like. As well as the memory 14, a hard disk may store the data used for the control program and the execution of the control program. The memory 14 may include a Random Access Memory (RAM) that holds data that is temporally used during the execution of the control program.

The network interface circuit 15 performs communication processing among the network control device 3 and the node devices 2b to 2e through the control network 5. The interface circuit 16 inputs and outputs a control signal among the control circuit 10 and the line interface circuits 11a and 11b and between the control circuit 10 and the switch circuit 12.

The line interface circuits 11a and 11b receive the user data from the transfer network 4 and then transmit the user data to the transfer network 4. The line interface circuits 11a and 11b include Field-Programming Gate Arrays (FPGA) 17a and 17b, respectively. The FPGAs 17a and 17b perform signal processing for transmission and reception of the user data. The switch circuit 12 performs route setting, that is, cross connect setting for inputting and outputting the user data by the line interface circuits 11a and 11b. The switch circuit 12 includes an FPGA 18 for performing the cross connect setting according to the control of the control circuit 10.

Figure 2:
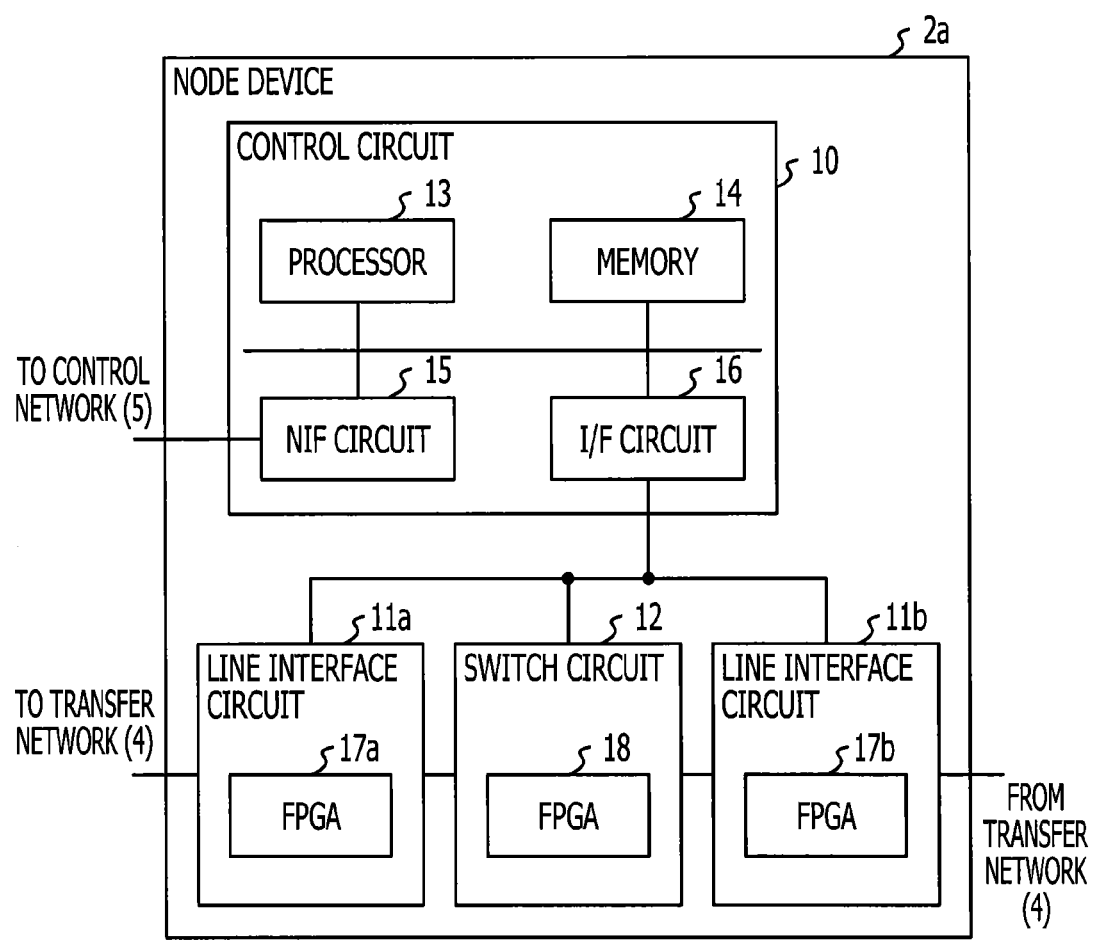
FIG. 2 is a diagram illustrating an example of a hardware configuration of a node device.

The hardware configuration illustrated in FIG. 2 is one of the hardware configurations that realize the node device 2a. Any hardware configuration may be employed if the configuration performs the following processing described in the present specification.

Figure 3:
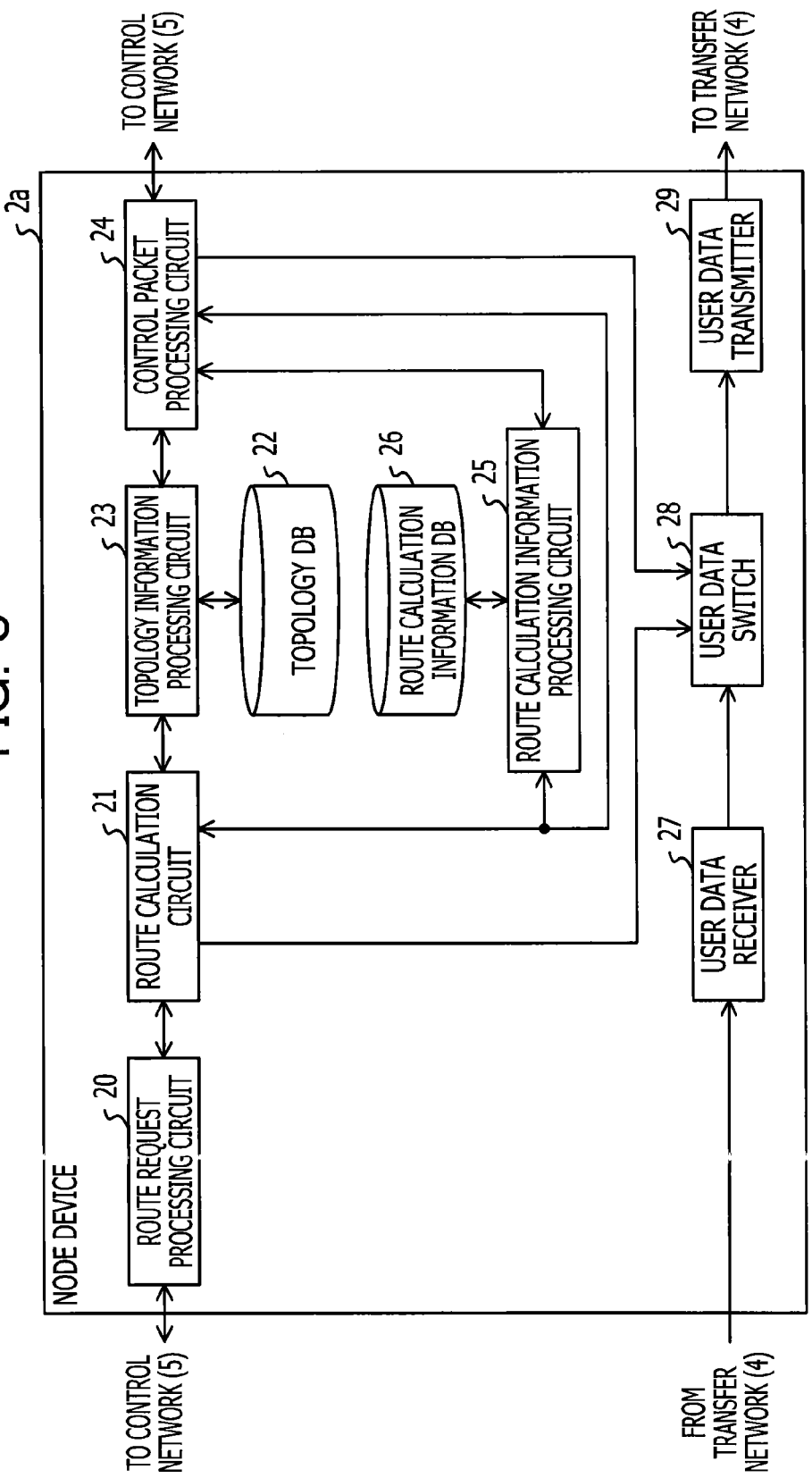
FIG. 3 is a diagram illustrating an example of a function block of the node device.

The function of the node device 2a realized by the above-described hardware configuration will be described below. FIG. 3 is a diagram illustrating an example of a function block of the node device 2a. The node device 2a includes a route request processing circuit 20, a route calculation circuit 21, a topology database 22, a topology information processing circuit 23, a control packet processing circuit 24, a route calculation information processing circuit 25, and a route calculation information database 26. The node device 2a includes a user data receiver 27, a user data switch 28, and a user data transmitter 29. FIG. 3 mainly illustrates a function related to the following explanation. The node device 2a may include other components other than the components illustrated in FIG. 3. In the attached diagrams, the database may be indicated as "DB."

The information processing by the route calculation circuit 21, the topology information processing circuit 23, and the route calculation information processing circuit 25 is performed by the processor 13 illustrated in FIG. 2. The signal processing by the route request processing circuit 20 is performed if a packet transmitted from the network control device 3 is received by the network interface circuit 15 and is then processed by the processor 13.

The signal processing by the control packet processing circuit 24 is performed if a control packet is transmitted and received among the node devices 2b to 2e through the network interface circuit 15 and then is processed by the processor 13. The topology database 22 and the route calculation information database 26 are stored in the memory 14. The signal processing by the user data receiver 27 and the user data transmitter 29 is performed by the FPGAs 17a and 17b included in the line interface circuits 11a and 11b. The cross connect setting processing by the user data switch 28 is performed by the FPGA 18 included in the switch circuit 12. In other embodiments, the route determination device that determines a route going through the node device 2a is provided as another information processing device separately from the node device 2a, and the route determination device may perform the signal processing by the components 20 to 26.

The route request processing circuit 20 receives a calculation request transmitted from the network control device 3. The calculation request is a signal that requests determination of a route in which the user data is transmitted. The route requested by the calculation request may be indicated as "request route." The calculation request includes specification information of a start node device, an end node device, a restriction condition, and a requested bandwidth of the request route.

The restriction condition of the request route is a restriction condition at a time of calculation of the request route that is determined according to the attribute of the request route. The restriction condition may have various types and/or characteristics according to the attribute of the route requested by a user. The restriction condition includes the following conditions (1) to (4), for example.

(1) "Reliability priority": The route is calculated in such a way that the route goes through a link with a higher reliability. For example, the route going through a link in which the route is redundant is calculated.

(2) "Low delay priority": The route is calculated in such a way that the signal delay on the route is reduced.

For example, the signal delay is reduced by selecting the node device with less processing delay as a node through which the route goes.

(3) "Shortest hop number": The route is calculated in such a way that the number of nodes through which the route goes is minimized.

(4) "Low power consumption": The route is calculated in such a way that the power consumption for the transmission of user data is reduced. For example, the power consumption is reduced by selecting a node device with low power consumption as a node through which the route goes.

The route request processing circuit 20 obtains the specification information of the start node device, the end node device, the restriction condition, and the requested bandwidth of the request route. The route request processing circuit 20 notifies the route calculation circuit 21 of the start node device, the end node device, the restriction condition, and the requested bandwidth.

Based on the information notified by the route request processing circuit 20, the route calculation circuit 21 determines whether to calculate the route requested by the calculation request. The route calculation circuit 21 performs the route calculation based on the network topology of the transfer network 4 stored in the topology database 22 according to the prescribed route calculation algorithm. Based on the topology information received from the node devices 2b to 2e and the network control device 3 through the control network 5, the topology information processing circuit 23 generates and maintains the network topology stored in the topology database 22.

The route calculation information processing circuit 25 stores route calculation information, in the route calculation information database 26, as information of the calculation result of the route from the route calculation circuit 21. FIG. 4 is a diagram illustrating an example of route calculation information to be stored in the route calculation information database 26. The route calculation information includes information elements "start node device," "end node device," "route," "restriction condition," "empty bandwidth," "valid flag," and "generation time."

The information elements "start node device," "end node device," and "restriction condition" are the start node device, the end node device, and the restriction condition of the request route specified by the calculation request, respectively. The information element "route" is a calculation result of the route calculated by the route calculation circuit 21 according to the calculation request. The information element "generation time" is a time when the route calculation information is generated. The information element "valid flag" will be described below.

For example, the route calculation information of the item number "No.=1" indicates that the start node device and the end node device indicates the node device 2a and the node device 2e, respectively and that the route calculated under the condition with the restriction condition "reliability priority" is a route going through the node devices in order of the node device 2a, the node device 2c, and the node device 2e. The empty bandwidth of the route is 100 Mbps, and the route is valid at the present moment. The generation time of the route calculation information indicates "12:30:00 Jul. 1, 2011."

For example, the route calculation information of the item number "No.=2" indicates that the start node device and the end node device indicate the node device 2a and the node device 2c, respectively and that the route calculated under the condition with the restriction condition "low delay priority" is a route going through the node devices in order of the node device 2a and the node device 2c. The empty bandwidth of the above-described route is 50 Mbps, and the route is invalid at the present moment. The generation time of the route calculation information indicates "12:40:30 on Jul. 1, 2011."

FIG. 3 will be described below. To determine whether to calculate the route requested by the calculation request, the route calculation circuit 21 determines whether the route calculation information stored in the route calculation information database 26 includes a route which conforms to the calculation request. At this time, if all the following conditions (1) to (3) are satisfied, the route calculation circuit 21 determines that the route calculation information includes the route which conforms to the calculation request.

(1) The whole or part of the route included in the route calculation information indicates a route that reaches the end node device from the start node device of the calculation request.

(2) The calculation request matches the restriction condition of the route calculation information.

(3) The requested bandwidth of the calculation request is equal to or smaller than the empty bandwidth of the route calculation information.

If the route calculation information includes the route which conforms to the calculation request, the route calculation circuit 21 determines the route which conforms to the calculation request by obtaining the route which conforms to the calculation request from the route calculation information without calculating the route. On the other hand, if the route calculation information does not include the route which conforms to the calculation request, the route calculation circuit 21 determines the route which conforms to the calculation request by performing the calculation request to determine the requested route. As described below, if the route calculation information includes part of the route which conforms to the calculation request, the route calculation circuit 21 calculates the rest of the route included in the route calculation information.

The route calculation circuit 21 instructs the cross connect setting to the user data switch 28 based on the determined route. According to the instruction from the route calculation circuit 21, the user data switch 28 sets the cross connect of the route in which the used data received from the user data receiver 27 is transmitted from the user data transmitter 29. The user data switch 28 sets the cross connect according to the control message of the signaling protocol received by the control packet processing circuit 24 from the node devices 2b to 2e. The route calculation circuit 21 notifies the control packet processing circuit 24 of the determined route. The control packet processing circuit 24 generates a signaling protocol control packet that performs path setting of the determined route and then transmits the signaling protocol control packet to the node devices 2b to 2e.

In another embodiment, the route calculation circuit 21 replies the determined route to the network control device 3. According to the information of the route received from the route calculation circuit 21, the network control device 3 generates a signaling protocol control packet that performs the path setting of the determined route and then transmits the signaling protocol control packet to the node device 2 through which the route goes.

If the route calculation circuit 21 performs the route calculation, the route calculation information processing circuit 25 outputs the route calculation information to the control packet processing circuit 24. The control packet processing circuit 24 transmits the received route calculation information included in the control packet to the node devices 2b to 2e to distribute the route calculation information to the node devices 2b to 2e.

The control packet processing circuit 24 may store the route calculation information in, for example, the control packet for a routing protocol and a signaling protocol and transmit the control packet to the node devices 2b to 2e. Therefore, the control packet for the routing protocol and the signaling protocol is extended. If the route calculation information is transmitted by being included in the control packet for the signaling protocol, advertisement may be made typically for the node device through which the calculated route goes. Therefore, extra control packets are prevented from flowing into the control network 5. The control packet processing circuit 24 may propagate the route calculation information by a protocol that is newly defined.

When receiving the control packet transmitting the route calculation information from the node devices 2b to 2e, the control packet processing circuit 24 transmits the route calculation information to the route calculation information processing circuit 25. The route calculation information processing circuit 25 stores, in the route calculation information database 26, the route calculation information received from the node devices 2b to 2e. In this manner, the route calculation information calculated by the node device 2 is shared among the node devices 2 if the route calculation information is exchanged by the node devices 2 with each other.

With reference to FIGS. 5 to 10, the processing of the node device 2 will be described below. In the transfer network 4 illustrated in FIG. 5, it is assumed that after the calculation request of the route with the node device 2a and the node device 2e as the start node and the end node respectively is generated, the calculation request of the route with the node device 2a and the node device 2c as the start node and the end node respectively and the similar restriction condition is generated.

Figure 6:
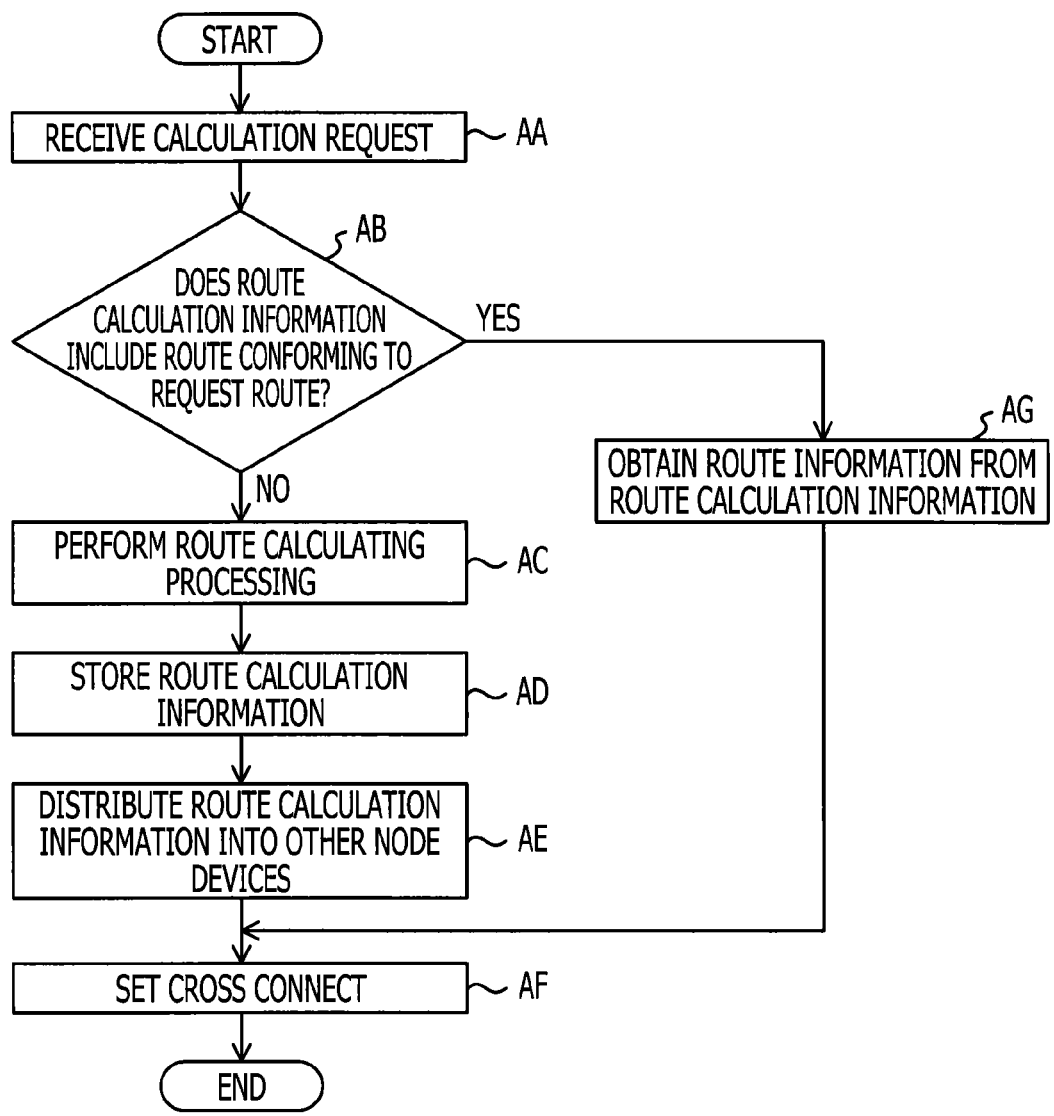
FIG. 6 is a diagram of an example of processing of the node device at a time of calculation request reception.
Figure 9:
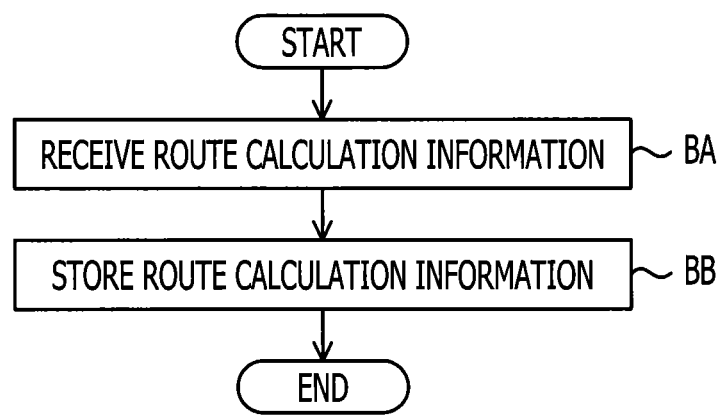
FIG. 9 is a diagram illustrating processing of the node device at a time of route calculation information reception.
Figure 14:
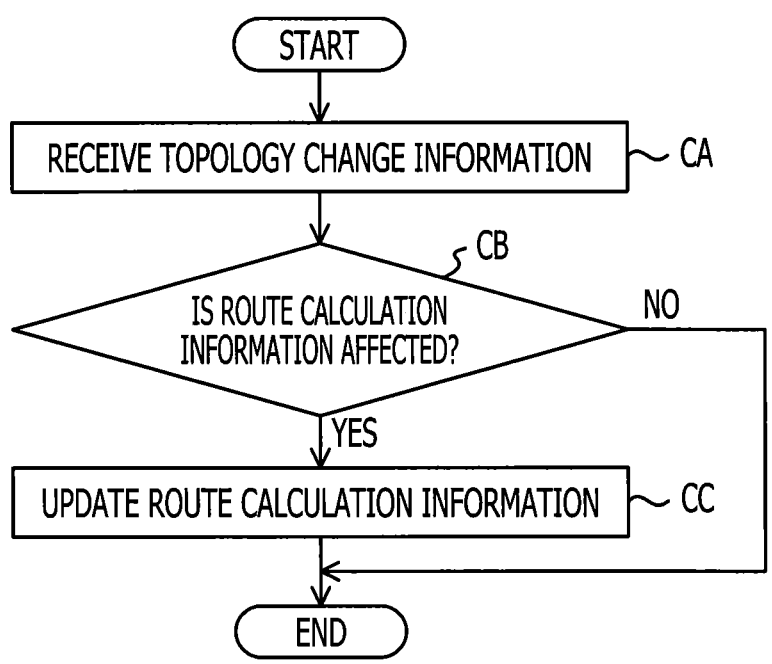
FIG. 14 is a diagram illustrating an example of processing of the node device at a time of topology change information reception.

FIG. 6 is a diagram illustrating an example of processing of a node device at the time of the calculation request reception. The sequential processing illustrated in FIG. 6 may be considered as a method that includes a plurality of procedures. In this case, "operation" may be read as "step." The processing illustrated in FIG. 9 and FIG. 14 is equivalent to FIG. 6.

In Operation AA, the route request processing circuit 20 receives, from the network control device 3, the calculation request of the route with the node devices 2a and 2e as the start node and the end node, respectively. In Operation AB, the route calculation circuit 21 determines whether the route calculation information stored in the route calculation information database 26 includes a route which conforms to the calculation request. If the route calculation information does not include the route which conforms to the calculation request (Operation AB: N), the process goes to Operation AC.

Figure 5:
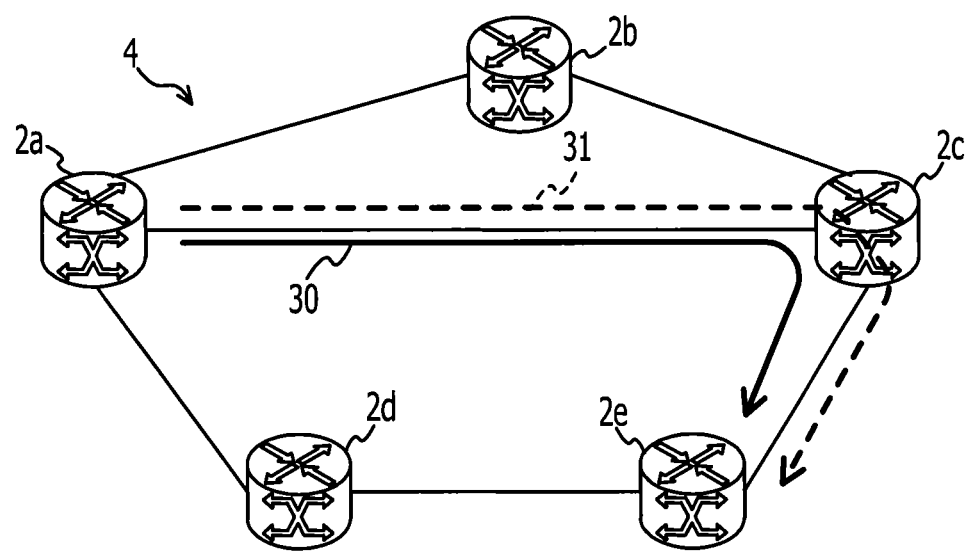
FIG. 5 is an explanation diagram (1) of route determining processing.

In Operation AC, the route calculation circuit 21 determines the route which conforms to the calculation request by performing the route calculation to determine the requested route. As a result, for example, the route indicated with the solid line in FIG. 5 is calculated. The route 30 goes through the node devices in order of the node device 2a, the node device 2c, and the node device 2e. In Operation AD, the route calculation information processing circuit 25 stores the route calculation information, which includes the calculation results from the route calculation circuit 21, in the route calculation information database 26.

In Operation AE, the control packet processing circuit 24 distributes the route calculation information into the node devices 2b to 2e. In Operation AF, the user data switch 28 sets the cross connect of the route 30 that is determined by the route calculation circuit 21. After that, the process ends.

In Operation AA, the route request processing circuit 20 again receives the calculation request of the start node device, the end node device, and the restriction condition equivalent to the route 30 from the network control device 3. In Operation AB, the route calculation circuit 21 determines whether the route calculation information stored in the route calculation database 26 includes the route which conforms to the calculation request.

If the current empty bandwidth of the route 30 is equal to or larger than the requested bandwidth, the route calculation information of the route 30 conforms to the calculation request (Operation AB: Y), the process goes to Operation AG. In Operation AG, the route calculation circuit 21 obtains the route which conforms to the calculation request from the route calculation information of the route 30 without calculating the route which conforms to the calculation request. As a result, the route calculation circuit 21 obtains a route 31 that is equivalent to the solid line 30 illustrated in FIG. 5. In Operation AF, the user data switch 28 sets the cross connect of the route 31 obtained by the route calculation circuit 21. After that, the process ends.

Figure 7:
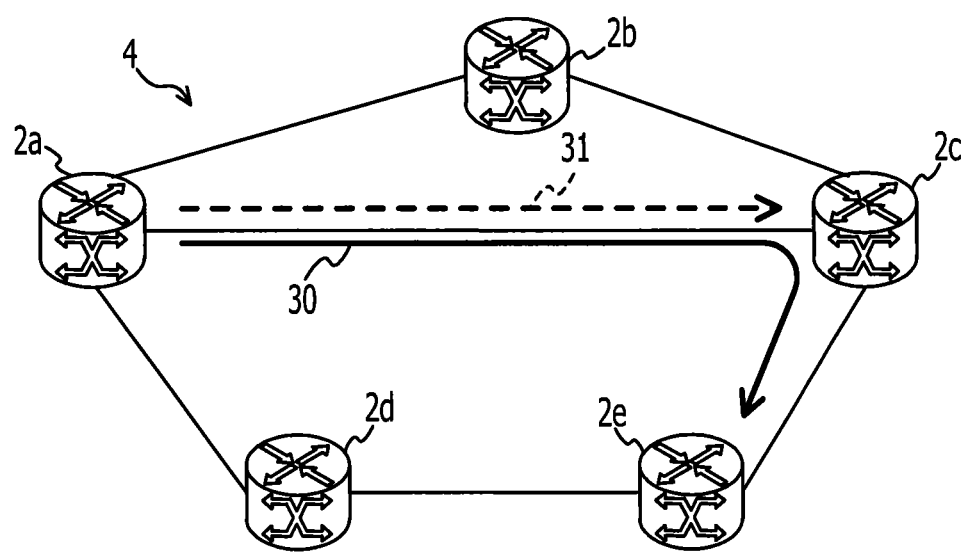
FIG. 7 is an explanation diagram (2) of the route determining processing.

With reference to the transfer network 4 illustrated in FIG. 7, a case where part of the route stored in the route calculation information database 26 is a route reaching the end node device from the start node device of the request route will be described below. It is assumed that after the calculation request of the route with the node device 2a and the node device 2e as the start node and the end node respectively is generated, the calculation request of the route with the node device 2a and the node device 2c as the start node and the end node respectively and the similar restriction condition is generated.

The route calculation circuit 21 calculates the route 30 going through the node devices in order of the node device 2a, the node device 2c, and the node device 2e as the route with the node device 2a and the node device 2e as the start node and the end node, respectively. The route calculation information processing circuit 25 stores, in the route calculation information database 26, the route calculation information that includes the calculation results calculated by the route calculation circuit 21.

After that, the route request processing circuit 20 receives the calculation request of the route with the node device 2a and the node device 2c as the start node and the end node respectively and the similar restriction condition. The route calculation circuit 21 determines whether the route calculation information stored in the route calculation information database 26 includes the route which conforms to the calculation request. The route 30 stored in the route calculation information database 26 is a route going through the node devices 2a, 2c, and 2e and partially includes the request route with the node device 2a and the node device 2c as the start node and the end node, respectively. Therefore, if the current empty bandwidth of the route 30 is equal to or larger than the requested bandwidth of the request route, the route calculation information of the route 30 includes the route confirming to the calculation request. Due to this, the route calculation circuit 21 obtains the route 31 from the route calculation information without calculating the route. The route 31 is a route going through the node devices in order of the node device 2a and the node device 2c.

With reference to the transfer network 4 illustrated in FIG. 8, a case where the route of the route calculation information stored in the route calculation information database 26 is part of the route reaching the end node device from the start node device of the request route will be described below. It is assumed that after the calculation request of the route with the node device 2a and the node device 2c as the start node and the end node respectively is generated, the calculation request of the route with the node device 2a and the node device 2e as the start node and the end node respectively and the similar restriction condition is generated.

The route calculation circuit 21 has the node device 2a and the node device 2c as the start node and the end node, respectively and calculates the route 30 going through the node devices in order the node device 2a and the node device 2c. The route calculation information processing circuit 25 stores, in the route calculation information database 26, the route calculation information that includes the calculation results calculated by the route calculation circuit 21.

After that, the route request processing circuit 20 receives the calculation request of the route with the node device 2a and the node device 2e as the start node and the end node respectively and the similar restriction condition. At this time, the route calculation circuit 21 determines whether the route of the route calculation information stored in the route calculation information database 26 includes part of the route which conforms to the calculation request.

An example of the processing for determining whether the route of the route calculation information includes part of the route which conforms to the calculation request will be described below. For each node device 2, a relay node device database that stores a relay node device specified in advance to be corresponding to a target node device is created and then is stored in the memory 14. The relay node device may relay the route going through the target node device. For example, the node devices 2c and 2d adjacent to the node device 2e may be specified as a relay node device corresponding to the node device 2e.

The route calculation circuit 21 determines that the route calculation information includes part of the route which conforms to the calculation request if the route of the route calculation information satisfies one of the following conditions, the restriction is similar, and the empty bandwidth of the current route is equal to or larger than the requested bandwidth of the request route.

(1) The route of the route calculation information includes a route reaching the end node device from the relay node device of the start node device of the request route.

(2) The route of the route calculation information includes a route reaching the relay node device of the end node device of the request route from the start node device of the request route.

(3) The route of the route calculation information includes a route reaching the relay node device of the end node device of the request route from the relay node device of the start node device of the request route.

Figure 8:
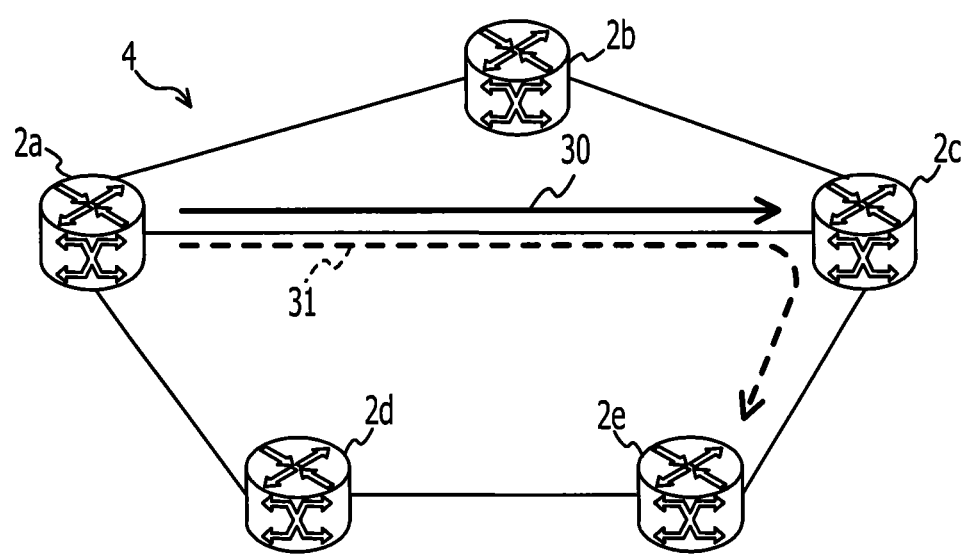
FIG. 8 is an explanation diagram (3) of the route determining processing.

In the example in FIG. 8, the route 30 stored in the route calculation information database 26 includes the route 30 reaching a relay node device 2c of an end node device 2e from a start node device 2a of the request route. Therefore, the current empty bandwidth of the route 30 is equal to or larger than the requested bandwidth of the request route, the route calculation information of the route 30 partially includes part of the route which conforms to the calculation request. Therefore, the route calculation circuit 21 obtains the route from the route calculation information without calculating the route for the section of the node devices 2a to 2c. The route calculation circuit 21 performs the route calculation for the rest of the section with the node device 2c and the node device 2e as the start node device and the end node device, respectively. The route 31 of the route calculation information is obtained by combining the route obtained from the route calculation information with the route obtained by the route calculation.

Processing in a case where the route calculation information that is calculated by the route calculation circuit 21 of the node devices 2b to 2e is received will be described. FIG. 9 is an explanation diagram of processing of the node device at a time of reception of the route calculation information. In Operation BA, the control packet processing circuit 24 receives the route calculation information calculated by the route calculation circuit 21 of the node devices 2b to 2e. In Operation BB, the route calculation information processing circuit 25 stores, in the route calculation information database 26, the route calculation information received from the node devices 2b to 2e. As a result, the route calculation information is shared with the node device of the transmission source.

Figure 10:
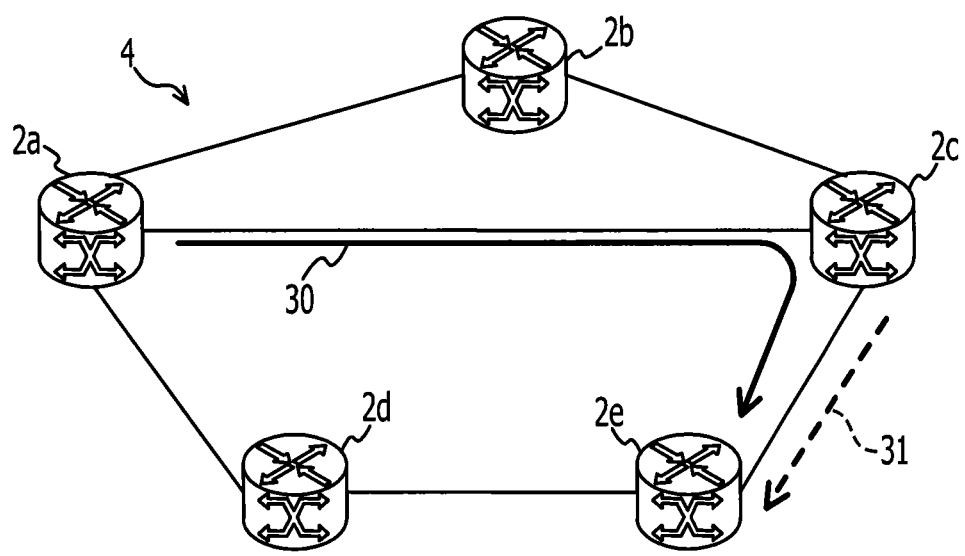
FIG. 10 is an explanation diagram (4) of the route determining processing.

With reference to the transfer network 4 illustrated in FIG. 10, a case where the route is determined based on the route calculation information shared among the plurality of node devices will be described below. It is assumed that after the calculation request of the route with the node device 2a and the node device 2e as the start node and the end node respectively is generated, the calculation request of the route with the node device 2c and the node device 2e as the start node and the end node, respectively and the similar restriction is generated.

The route calculation circuit 21 calculates the route 30 going through the node devices in order of the node device 2a, the node device 2c, and the node device 2e as the route with the node device 2a and the node device 2e as the start node and the end node, respectively. The control packet processing circuit 24 distributes the route calculation information that includes the calculation result calculated by the route calculation circuit 21 into the node devices 2b to 2e. Each of the node devices 2b to 2e stores the received route calculation information in the route calculation information database 26.

After that, the route request processing circuit 20 receives the calculation request of the route with the node device 2c and the node device 2e as the start node and the end node respectively and the similar restriction condition. The route calculation circuit 21 of the node device 2c determines whether the route calculation information stored in the route calculation information database 26 includes the route which conforms to the calculation request.

The route calculation information database 26 in the node device 2c stores the route 30 that goes through the node devices 2a, 2c, and 2e and partially includes the route with the node device 2c and the node device 2e as the start node and the end node, respectively. Therefore, if the current empty bandwidth of the route 30 is equal to or larger than the required bandwidth of the request route, the route calculation information of the route 30 partially includes the route which conforms to the calculation request. Due to this, the route calculation circuit 21 obtains the route 31 from the route calculation information without calculating the route. The route 31 is a route going through the node devices in order of the node device 2c and the node device 2e.

According to a first embodiment, if the results from the route calculation that was performed before are reused, wasted time for the same calculation is not generated. Therefore, processing load for the route determination and the power consumption of the processor may be reduced. Further, a response speed corresponding to the calculation request may be improved.

According to the first embodiment, the opportunities for reusing the past calculation results may be increased if the other node devices reuse the results from the route calculation that was performed before. According to the first embodiment, since the results from the route calculation may be reused even if the results from the route calculation that was performed before partially overlap with the request route, the opportunities for reusing the past calculation results are increased. Therefore, the processing load for the route determination and the power consumption of the processor may be further reduced. Further, the response speed corresponding to the calculation request may be improved.

A second embodiment will be described below. According to the first embodiment, the node device 2a shares the route calculation information with the node devices 2b to 2e by transmitting the route calculation information of the route calculated by the route calculation circuit 21. According to the second embodiment, the node device 2a transmits the route calculation information to the network control device 3. As the network control device 3 distributes the route calculation information received from the node device 2a, the route calculation information is shared among a plurality of node devices 2.

Figure 11:
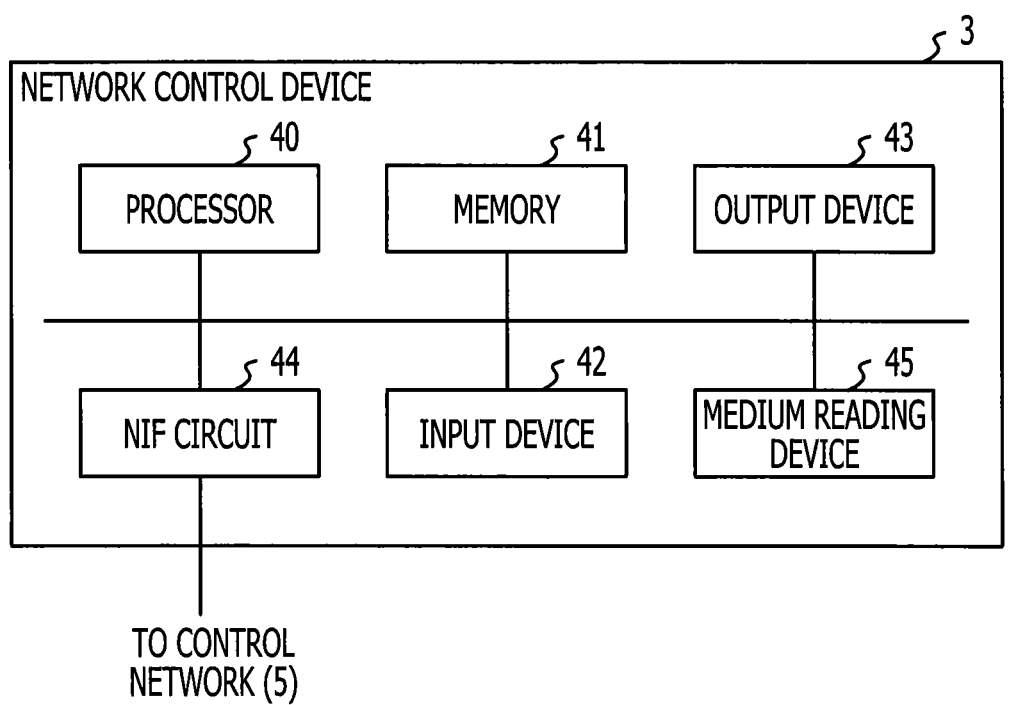
FIG. 11 is a diagram illustrating an example of a hardware configuration of a network control device.

FIG. 11 is a diagram illustrating an example of a hardware configuration of the network control device 3. The network control device 3 includes a processor 40, a memory 41, an input device 42, an output device 43, a network interface circuit 44, and a medium reading device 45.

By executing the network control program stored in the memory 41, the processor 40 performs processing for monitoring and controlling the transfer network 4 and the following processing. The memory 41 may include a non-volatile memory, which stores the network control program and each data used for the execution, and a read-only memory. As well as the memory 41, a hard disk or the like may store the network control program and each data used for the execution. The memory 41 may include a random access memory that stores data that is temporally used while the network control program is being executed.

The input device 42 accepts input operation by the maintainer. The input device 42 may be, for example, a button, a scroll wheel, a keypad, a keyboard, a pointing device, a touch panel, or the like. The output device 43 presents state information of the transfer network 4 and an operation screen that controls the transfer network 4 to the maintainer. The output device 43 may be, for example, a display device or the like that visually displays information.

The network interface circuit 44 performs communicating processing with the node device 2 going through the control network 5. The medium reading device 45 is an input device that reads data recorded in a computer-readable portable recording medium. The medium reading device 45 is, for example, a CD-ROM drive device, a DVD-ROM drive device, a flexible disk drive device, a CD-R drive device, a DVD-R drive device, an MO drive device, or an access device to a flash memory device. For example, the network control program is stored in the above-described portable recording medium and is read by the medium reading device 45 to be installed in the memory 41.

Figure 12:
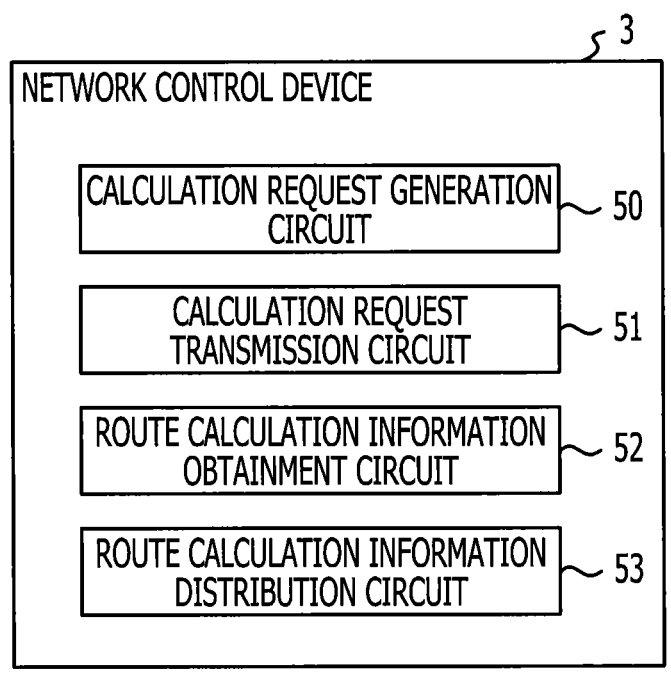
FIG. 12 is a diagram illustrating an example of a function block of the network control device.

The function of the network control device 3 that is realized by the above-described hardware configuration will be described below. FIG. 12 is a diagram illustrating an example of a function block of the network control device 3. The network control device 3 includes a calculation request generation circuit 50, a calculation request transmission circuit 51, a route calculation information obtainment circuit 52, and a route calculation information distribution circuit 53. The information processing by the calculation request generation circuit 50, the calculation request transmission circuit 51, the route calculation information obtainment circuit 52, and the route calculation information distribution circuit 53 are performed by the processor 40 illustrated in FIG. 11. FIG. 12 mainly illustrates the function related to the following description. The network control device 3 may include other components other than the components illustrated in FIG. 12.

The calculation request generation circuit 50 generates the calculation request that requests determination of the route in which the user data is transmitted. The calculation request transmission circuit 51 transmits the generated calculation request to the node device 2. For example, the calculation request transmission circuit 51 transmits the generated calculation request to the start node device of the request route.

After receiving the calculation request, the route request processing circuit 20 in the node device 2 transmits the route calculation information of the route calculated by the route calculation circuit 21 to the network control device 3 if the route calculation circuit 21 calculates the route requested by the calculation request. The route calculation information obtainment circuit 52 receives the route calculation information transmitted from the node device 2. The route calculation information distribution circuit 53 distributes the route calculation information to the node devices 2 through the control network 5. The route request processing circuit 20 in the node device 2 receives the route calculation information transmitted from the network control device 3. The route calculation information processing circuit 25 stores the received route calculation information in the route calculation information database 26.

According to the second embodiment, the route calculation information may be shared through the network control device 3. Therefore, compared to the case of transmitting in the control packet for the routing protocol or the signaling protocol, there is an advantage that the route calculation information may be shared without extending the control packet.

Figure 13:
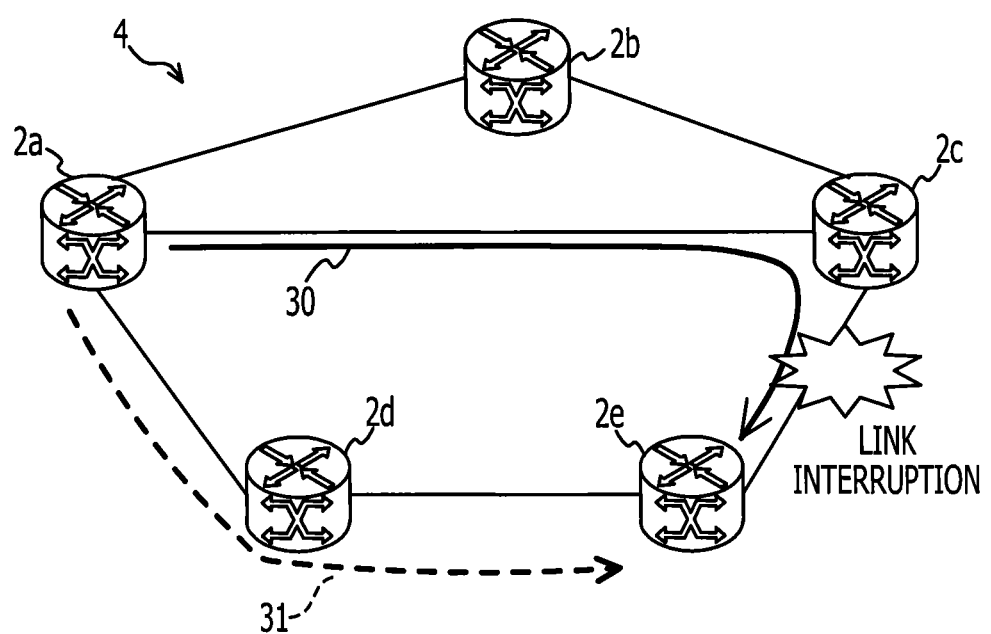
FIG. 13 is an explanation diagram (5) of the route determining processing.

A third embodiment will be described below. According to the third embodiment, if the topology of the transfer network 4 is changed, the route calculation information to be stored in the route calculation information database 26 is updated. In the transfer network 4 illustrated in FIG. 13, it is assumed that after the calculation request of the route with the node device 2a and the node device 2e as the start node and the end node respectively is generated, the link on the route is interrupted and the network topology is changed.

If the calculation request of the route with the node device 2a and the node device 2e as the start node and the end node respectively is generated, the route calculation circuit 21 calculates the route 30. The route 30 goes through the node devices in order of the node device 2a, the node device 2c, and the node device 2e. The route calculation information processing circuit 25 stores, in the route calculation information database 26, the route calculation information that includes the calculation results calculated by the route calculation circuit 21. After that, the link between the node device 2c and the node device 2e is interrupted. If the network topology is changed due to the link interruption, the topology change information reporting the change of the network topology is propagated to the node devices 2a to 2e.

FIG. 14 is a diagram illustrating an example of processing of a node device at a time of reception of topology change information. In Operation CA, the control packet processing circuit 24 receives the topology change information. In Operation CB, the route calculation information processing circuit 25 analyses the content of the topology change. The route calculation information processing circuit 25 determines whether the topology change affects the route of the route calculation information stored in the route calculation information database 26. If the topology change does not affect the route of the route calculation information (Operation CB: N), the process ends.

In the example illustrated in FIG. 14, the topology change is the link interruption on the route 30 of the route calculation information stored in the route calculation information database 26, and the topology change affects the route 30 (Operation CB: N). In this case, the process goes to Operation CC. In Operation CC, the route calculation information processing circuit 25 updates the route calculation information that is affected by the topology change.

The topology change and the updating processing of the route calculation information in association with the topology change will be described below. For example, the route calculation information processing circuit 25 deletes the route calculation information of the route 30 if the link on the route 30 of the route calculation information is interrupted. Even if the route calculation information of the route 30 stored in the route calculation information database 26 is received from another node device 2, the route calculation information processing circuit 25 deletes the route calculation information of the route 30 if the link on the route 30 of the route calculation information is interrupted.

If the calculation request with the start node, end node, and restriction equivalent to the route 30 is generated, the route calculation circuit 21 of the node device 2 determines whether that the route calculation information stored in the route calculation information database 26 includes the route which conforms to the calculation request. At this time, since the route 30 is deleted, the route calculation information is not stored in the route calculation information database 26. Therefore, by performing the route calculation, the route calculation circuit 21 calculates the route 31 as the route which conforms to the calculation request. The route 31 goes through the node devices in order of the node device 2a, the node device 2d, and the node device 2e.

Another example of the updating processing of the route calculation information will be described. The route calculation information processing circuit 25 invalidates the route calculation information of the route 30 if the link on the route 30 of the route calculation information is interrupted. For example, the route calculation information processing circuit 25 invalidates the route calculation information by setting the value of the information component "valid flag" illustrated in FIG. 4 to "invalid." To validate the route calculation information, the route calculation information processing circuit 25 sets the value of the information component "valid flag" illustrated in FIG. 4 to "valid." Even if the route calculation information of the route 30 stored in the route calculation information database 26 is received by another node device 2, the route calculation information processing circuit 25 invalidates the route calculation information of the route 30 if the link on the route 30 of the route calculation information is interrupted.

After that, it is assumed that the calculation request with the start node, end node, and restriction condition equivalent to the route 30 is generated while the route calculation information of the route 30 is invalidated. Since the route 30 is invalidated at this time, the route calculation circuit 21 determines that the route may not be obtained from the route calculation information of the route 30. As a result, by performing the route calculation, the route calculation circuit 21 calculates the route 31 as the route which conforms to the calculation request. The route 31 goes through the node devices in order of the node device 2a, the node device 2d, and the node device 2e.

If the link between the node device 2c and the node device 2e is recovered, the topology change reporting the change of the network topology is propagated to the node devices 2a to 2e. The route calculation information processing circuit 25 analyses the content of the topology change and determines whether the topology change affects the route of the route calculation information stored in the route calculation information database 26.

In this case, the topology change indicates the recovering of the link on the route 30 that is invalidated and affects the route 30. Therefore, the route calculation information processing circuit 25 validates the route calculation information of the route 30. As a result, if the calculation request with the start node, the end node, and the restriction condition equivalent to the route 30 is generated, the route calculation circuit 21 may obtain the route from the route calculation information of the route 30.

A case where the topology change is a change of the empty bandwidth of the route 30 of which the route calculation information is stored in the route calculation information database 26 will be described. For example, a portion between the node device 2c and the node device 2e in the route 30 is redundant by link bundle or link aggregation, and a change of the empty bandwidth is generated when the link is interrupted in the portion If the link between the node device 2c and the node device 2e is interrupted, the topology change information reporting the change of the network topology is propagated to the node devices 2a to 2e according to the routing protocol. If the interrupted link is a redundant link, the topology change information indicating reduction of the valid bandwidth is propagated. The route calculation information processing circuit 25 analyses the content of the topology change and determines whether the topology change affects the route of the route calculation information stored in the route calculation information database 26.

In this case, the topology change indicates the reduction of the valid bandwidth on the route 30 and affects the route 30. Therefore, the route calculation information processing circuit 25 decreases the value of the empty bandwidth of the route calculation information of the route 30. Even if the route calculation information of the route 30 is received from another node device 2, the route calculation information processing circuit 25 decreases the value of the empty bandwidth of the route calculation information of the route 30.

After that, if the calculation request with the start node, the end node, and the restriction condition equivalent to the route 30 is generated, the route calculation circuit 21 determines whether the route calculation information stored in the route calculation information database 26 includes the route which conforms to the calculation request. At this time, if the empty bandwidth of the route 30 is smaller than the requested bandwidth, the route calculation circuit 21 determines that the route may not be obtained from the route calculation information of the route 30. As a result, by performing the route calculation, the route calculation circuit 21 calculates the route 31 as the route which conforms to the calculation request. The route 31 goes through the node devices in order of the node devices 2a, the node device 2d, and the node device 2e.

After that, the link between the node device 2c and the node device 2e is recovered, the topology change information reporting the change of the network topology is propagated to the node devices 2a to 2e. The route calculation information processing circuit 25 analyses the content of the topology change and determines whether the topology change affects the route of the route calculation information stored in the route calculation information database 26. In this case, the topology change indicates an increase of the valid bandwidth on the route 30 and effects the route 30. Therefore, the route calculation information processing circuit 25 increases the value of the empty bandwidth of the route calculation information of the route 30.

According to the third embodiment, if there is a network topology change, the route calculation information is updated based on the topology change information. The route calculation information may be routinely discharged every certain time of period as processing for making the route calculation information follow the latest state of the network topology. According to the third embodiment, the opportunities of discharging the route calculation information may be reduced. According to the third embodiment, the time of period for reusing the route calculation information is increased, so that the wasted time for the similar calculation is further eliminated. Therefore, the processing load for the route determination and the power consumption of the processor may be further reduced. The response speed corresponding to the calculation request may be improved.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A route determination device of a node device included in a network having a plurality of node devices, the route determination device comprising:
  a memory to store route information of routes among the plurality of node devices, the route information for each route including a start node device of the route, an end node device of the route, a restriction condition that the route satisfies, and an amount of empty bandwidth available on the route; and a processor to execute a process including:
receiving a calculation request which requests determination of a specific route for transmitting data, the calculation request including indication of a specific start node device, a specific end node device, a specific restriction condition, and a requested bandwidth for the specific route, determining whether the memory stores a route that satisfies (1) a whole or a part of the stored route reaches the specific end node device from the specific start node device, (2) the restriction condition of the stored route matches the specific restriction condition, and (3) the amount of empty bandwidth available on the stored route is equal to or larger than the requested bandwidth, when it is determined that the memory does not store a route that satisfies (1), (2), and (3), determining a new route which conforms to the calculation request by performing the route calculation, storing route information of the new route in the memory, and transmitting the route information of the new route to all of the other node devices, and when it is determined that the memory stores a route that satisfies (1), (2), and (3), obtaining the route which conforms to the calculation request from the memory.

2. The route determination device of the node device according to claim 1, wherein the processor executes the process including:
receiving topology information which reports a change of a topology of the network;
determining whether the change of the topology affects a route for which route information is stored in the memory; and
when the determining determines that the change of the topology affects a route, performing updating processing to update the route information of the route for which the determining determines that the change of topology affects.

3. The route determination device of the node device according to claim 2, wherein the processor executes a process for deleting the route information of the route for which the determining determines that the change of topology affects.

4. The route determination device of the node device according to claim 2, wherein the processor executes the process including:
invalidating the route information of the route for which the determining determines that the change of topology affects; and
validating the invalidated route information when the change is recovered.

5. The route determining device of the node device according to claim 2,
wherein the change of the topology is a change of the empty bandwidth of a link among the node devices.

6. A node device of a plurality of nodes devices which form a network, the node device comprising:
a processor; and
a memory to store route information of routes among the plurality of node devices, the route information for each route including a start node device of the route, an end node device of the route, a restriction condition that the route satisfies, and an amount of empty bandwidth available on the route, wherein the processor executes a process including:
receiving a calculation request which requests determination of a specific route for transmitting data, the calculation request including indication of a specific start node device, a specific end node device, a specific restriction condition, and a requested bandwidth for the specific route, determining whether the memory stores a route that satisfies (1) a whole or a part of the stored route reaches the specific end node device from the specific start node device, (2) the restriction condition of the stored route matches the specific restriction condition, and (3) the amount of empty bandwidth available on the stored route is equal to or larger than the requested bandwidth, when it is determined that the memory does not store a route that satisfies (1), (2), and (3), determining a new route which conforms to the calculation request by performing the route calculation, storing route information of the new route in the memory, and transmitting the route information of the new route to all of the other node devices, and when it is determined that the memory stores a route that satisfies (1), (2), and (3), obtaining the route which conforms to the calculation request from the memory.

7. A route determination method for a node device included in a network having a plurality of node devices, the method comprising:
by at least one computer:
storing, in a memory, route information of routes among the plurality of node devices, the route information for each route including a start node device of the route, an end node device of the route, a restriction condition that the route satisfies, and an amount of empty bandwidth available on the route;

receiving a calculation request which requests determination of a specific route for transmitting data, the calculation request including indication of a specific start node device, a specific end node device, a specific restriction condition, and a requested bandwidth for the specific route;

determining whether the memory stores a route that satisfies (1) a whole or a part of the stored route reaches the specific end node device from the specific start node device, (2) the restriction condition of the stored route matches the specific restriction condition, and (3) the amount of empty bandwidth available on the stored route is equal to or larger than the requested bandwidth;

when it is determined that the memory does not store a route that satisfies (1), (2), and (3), determining a new route which conforms to the calculation request by performing the route calculation, storing route information of the new route in the memory, and transmitting the route information of the new route to all of the other node devices; and when it is determined that the memory stores a route that satisfies (1), (2), and (3), obtaining the route which conforms to the calculation request from the memory.

* * * * *